J. E. & F. W. McCONNELL.
SEPARABLE FASTENER.
APPLICATION FILED DEC. 5, 1908.
936,148.  Patented Oct. 5, 1909.
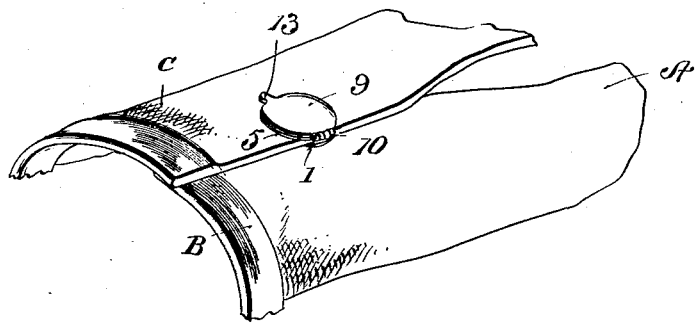
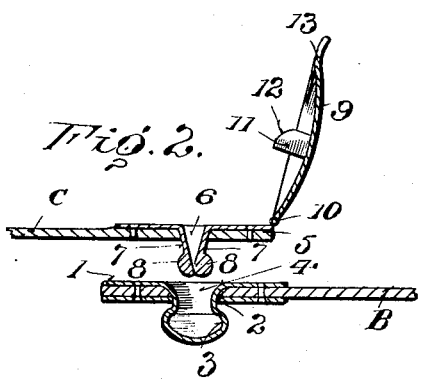
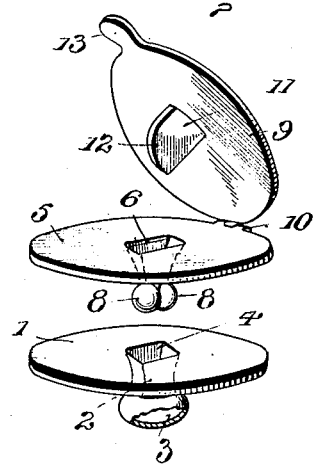
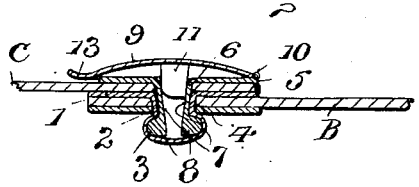
Inventors
John E. McConnell
Fred W. McConnell

UNITED STATES PATENT OFFICE.

JOHN E. McCONNELL AND FREDERICK W. McCONNELL, OF PAXTON, NEBRASKA.

SEPARABLE FASTENER.

936,148.  Specification of Letters Patent.  Patented Oct. 5, 1909.

Application filed December 5, 1908. Serial No. 466,133.

*To all whom it may concern:*

Be it known that we, JOHN E. McCONNELL and FREDERICK W. McCONNELL, citizens of the United States, residing at Paxton, in the county of Keith and State of Nebraska, have invented certain new and useful Improvements in Separable Fasteners, of which the following is a specification.

This invention relates to that class of devices commonly known as separable fasteners and adapted more especially for use upon gloves and other articles of wearing-apparel, although its use is by no means confined to this class.

The fastener consists of two well-known parts, one forming a socket member and the other a stud member. The invention consists principally in the stud member and the operating member which is attached thereto.

Referring to the drawings forming a part of the specification: Figure 1 reperesents the wrist-portion of the gloove with our improved fastener applied to it. Fig. 2 is an enlarged cross sectional view of the fastening, it being separated. Fig. 3 is a perspective view of the socket, stud and operating member, the parts being shown separated; and, Fig. 4 is a cross section taken through the center of the fastening when its parts are interlocked.

Corresponding and like parts are referred to in the following description and indicated in all the views of the drawings by the same reference characters.

In carrying out our invention we provide a glove to which our improved fastener is attached. We attach the socket-piece to the lower flap B.

C represents the upper flap of the glove to which the stud member is attached.

The socket-piece is made of light sheet metal and consists of a flat plate 1 which may be of any shape, but is preferably circular. An opening 4 is formed in the central portion of the plate 1 and may be of a convenient size and its shape is preferably oblong, but it is to be understood that it may be of any contour. Depending from the edges of the opening 4 is a neck portion 2 which is enlarged at its lower end to form a chamber 3, said lower end being preferably closed. The stud-piece is also made of light sheet metal and consists of a flat plate 5 which is preferably the same size and shape as the plate 1. An opening 6 is formed in the central portion of the plate 3 and is of the same size and shape as the opening 4. Depending from opposite edges of said opening 6 are two resilient members 7. The resilient members 7 converge at a short distance from the plate 5. The members 7 are provided at their lower ends with rounded projections 8, the said projections conforming with the inner side of the enlarged portion of the neck 2, or chamber 3. A cap plate 9 is hingedly connected to the plate 5 at 10 and is of the same shape and size as said plate 5. A projection or wedge 11 is so arranged on the underside of the cap plate 9 so as to enter the opening 6 in the stud plate 4 when said plates are brought together. The wedge 11 is rectangular in side view and the corner away from the hinge 10 is made rounded as at 12 so as to clear the end of the opening 6 in the stud plate when the cap plate is swung downward. The cap plate 9 and wedge, or projection 11, constitute the operating member. An extension 13 forming a finger-piece is provided on the edge of the operating member directly opposite the hinge 10.

The stud and socket pieces are to be secured to the articles to be fastened in any well-known manner.

In the operation of the device the plates 1 and 5 are brought together causing the resilient members 7 to enter the neck 2 and chamber 3 of the socket-piece. The cap plate 9 is then swung downward to cause the projection 11 to pass through the openings 6 and 4 in the plates 5 and 1, respectively, and between the resilient members 7. The rounded corner 12 on the projection insures against the catching of the projection on the end of the opening 6 in the plate 5. The members 7 are forced apart as the projection 11 wedges in between them, thereby causing the projections 8 to engage the outer portion of the chamber 3 and securely hold the stud member to the socket member. The resilient members 7 will firmly press against the projection 11 and hold it, so as to prevent the cap plate from swinging on its hinged connection. To disengage the parts all that is necessary is to insert the finger nail beneath the projection 13 and raise the cap plate, thereby withdrawing the projection 11 from between the resilient members 7, which latter will then readily spring together. The stud member can then be easily removed from the socket.

It will be seen from the foregoing description, taken in connection with the accompanying drawings, that we have provided a separable fastener which after the parts have been coupled are prevented from casual disengagement by positive engagement of the parts of the stud member with the socket member, said parts being prevented from separation so long as the operating member occupies a position with the projection between the elements or parts comprising the stud. It is to be further observed that the fastening is simple and neat, and may be cheaply manufactured.

In gloves provided with our fastening it will not be necessary to pull on the edge of the glove, in unfastening the same, as is required to be done with fasteners ordinarily applied to gloves.

Having thus described the invention, what we claim as new is:

In a fastener as specified the combination of a plate having an aperture formed centrally therethrough, a neck depended centrally from said plate, an enlargement formed in the lower end of said neck, a second plate having an aperture centrally formed therethrough adapted for engagement upon said first plate, a pair of resilient tongues depended from said second plate and adapted for engagement in said neck, projections formed on the lower ends of said tongues and extended outwardly therefrom, a cap hingedly disposed on said second plate, and a wedge formed of a strip of metal having rounded corners carried by said cap for engagement through said second plate and between said tongues to diverge said projections in the enlarged portion of said neck.

In testimony whereof we affix our signatures in presence of two witnesses.

JOHN E. McCONNELL.
FRED. W. McCONNELL.

Witnesses:
H. McVEY,
O. M. GUNNELL.